United States Patent [19]

Monticelli

[11] 4,236,561
[45] Dec. 2, 1980

[54] SELF-LOCKING NUT

[76] Inventor: Giulio Monticelli, Via Savona, 134 Milan, Italy

[21] Appl. No.: 8,776

[22] Filed: Feb. 2, 1979

Related U.S. Application Data

[63] Continuation of Ser. No. 848,038, Nov. 3, 1977, abandoned.

[30] Foreign Application Priority Data

Nov. 12, 1976 [IT] Italy .................. 29269 A/76

[51] Int. Cl.² ........................................... F16B 39/36
[52] U.S. Cl. ............................... 151/19 R; 151/21 R
[58] Field of Search ............... 151/19 R, 19 A, 21 R, 151/21 C

[56] References Cited

U.S. PATENT DOCUMENTS

| 668,738 | 2/1901 | O'Sullivan | 151/19 A |
| 987,106 | 3/1911 | Blanton | 151/19 R |
| 1,717,789 | 6/1929 | Larrad | 151/19 R |
| 1,820,965 | 9/1931 | D'Halloy | 151/19 R |
| 2,321,466 | 6/1943 | Crowther | 151/19 R |
| 2,402,583 | 6/1946 | Schumacher | 151/19 R |
| 2,576,890 | 11/1951 | Poupitci | 151/19 R |
| 3,030,996 | 4/1962 | Doerr | 151/19 R |
| 3,087,371 | 4/1963 | Orner | 151/19 R X |
| 3,429,352 | 2/1969 | Akashi | 151/19 R |
| 3,973,611 | 10/1976 | Profit | 151/19 A |

FOREIGN PATENT DOCUMENTS

| 522476 | 4/1955 | Italy | 151/19 R |
| 586083 | 3/1947 | United Kingdom | 151/19 A |
| 641046 | 8/1950 | United Kingdom | 151/19 R |

*Primary Examiner*—Thomas J. Holko
*Attorney, Agent, or Firm*—Young & Thompson

[57] ABSTRACT

Self-locking nut comprising an outer polygonal surface and a threaded hole defining a thread inner surface. Longitudinal slits are formed between said surfaces, defining resilient locking means, radially acting and restricting or narrowing the threaded hole of the nut at one end of the latter.

1 Claim, 12 Drawing Figures

SELF-LOCKING NUT

This is a continuation of application Ser. No. 848,038 filed Nov. 3, 1977 and now abandoned.

This invention relates to a self-locking nut assembly for substantially reducing the risk of nut loosening by shocks, vibrations and the like, to which a nut is ordinarily subjected during use.

It is well known that for nut locking use is normally made of spring washers interposed between the nut and a bearing plane. Therefore, nut locking depends upon the elastic reaction of the washer in an axial direction tending to hold the threads on the nut and screw, or other equivalent member on which said nut is screwed down, in mutual engagement relationship. It is also known to use special metal fittings conformed to engage with one side of the nut and tending to avoid nut unscrewing. It has also been proposed to make self-locking nuts with nylon inserts, or differently shape the nut thread.

All of the prior art systems suffer from the basic disadvantage of not providing a correct nut locking under the various operating conditions of the latter, or having undue production costs and problems.

It is the object of the present invention to provide a self-locking nut for correctly locking the nut through a radial action between the threads and to allow relatively low costs of production.

Generally, according to the invention, a self-locking nut is provided comprising a body having a polygonal outer surface and an axial hole defining a threaded inner surface, wherein said body has between said surfaces and from one end thereof the formation of at least one longitudinal slit, resilient locking means or devices being also provided, which are radially effective to restrict the threaded nut hole at said end.

A first embodiment of the self-locking nut is particularly adapted either when desiring to stop or block the nut at any position along the screw or other equivalent threaded member, or when high driving torques cannot be used in order not to damage the material in contact with the nut, such as for example when securing wood panels, crystal surfaces and the like. According to such an embodiment, the nut is shaped to have longitudinal slits arranged in radial planes, therebetween defining internally threaded sectors that are previously inwardly bent to be convergent to the nut axis. Such threaded sectors define resilient locking means which, upon screwing the nut down on a screw, are spread apart and react on the screw with a radial thrust tending to avoid casual unscrewing of the nut. By varying the angulation given to the individual sectors relative to the nut axis, the radial thrust action on the screw thread can be adjusted, and accordingly the self-locking degree of the nut.

Where high driving torques are required, the nut is shaped at that end thereof where said slits begin to appear with a cylindrical neck for penetrating and engaging in a contraction ring having a slightly smaller inner diameter or opposing parts of its inner profile, the spacing of which is slightly less than the nut neck diameter. By suitably calculating the interference between the nut neck and the inner surface of the contraction ring, and imparting a suitable radial elasticity to the latter, self-locking of the nut can be modified or adjusted, and any tolerances in the thread diameters can be compensated for as well. The contraction ring also performs the function of limiting the sector vibrations in highly stressed mechanisms.

Some examples of self-locking nuts according to the invention will be hereinafter described with reference to the figures of the accompanying drawings, in which.

Figure 1:
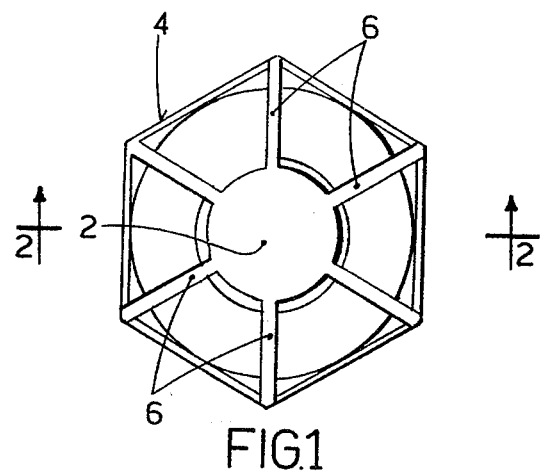
FIG. 1 is a plan view for a first embodiment of a self-locking nut according to the invention.
Figure 2:
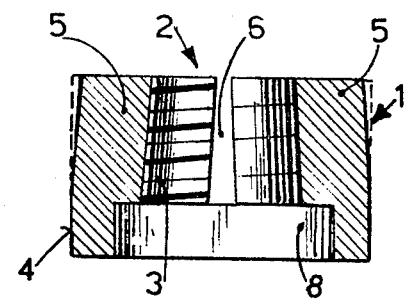
FIG. 2 is a cross-section taken along line 2—2 of FIG. 1.
Figure 3:
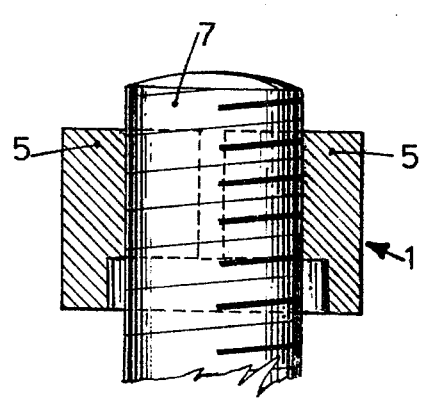
FIG. 3 shows the nut of FIGS. 1 and 2 when being screwed down on a general screw or threaded member.

Referring to FIGS. 1–3 a first embodiment of a self-locking nut according to the present invention will now be described.

As shown in said figures, the nut comprises a body 1 having an axial hole 2 defining an inner surface with a cylindrical threading 3, and a polygonal outer surface 4.

The nut is provided with resilient self-locking means or devices in the form of spring sectors 5 defined by a plurality of longitudinal slits 6 extending from the inner surface to said outer surface, which slits 6 lie in radial planes from one end of the nut, as shown. In this particular case, six threaded sectors have been provided, but the number thereof could be also other than that shown.

As schematically shown in FIG. 1, sectors 5 are inwardly bent to converge toward the nut axis. This convergency of threaded sectors 5 causes a partial narrowing of the threaded nut hole which, therefore, is of a diameter at said end slightly smaller than that of a screw 7 (FIG. 3) or other threaded member on which said nut 1 is to be screwed down.

From the foregoing and with reference to FIG. 3, as well as to FIG. 1, where by full line and dashed lines the possible positions taken by the individual resilient sectors are schematically shown, it will be apparent that self-locking of nut 1 occurs by spring reaction or thrust radially exerted on the screw threading by individual sectors 5 spread apart by screw 7.

From the foregoing and as shown, it is also apparent that nut self-locking may occur at any position along screw 7, exclusively depending on radial spring reaction of the individual threaded sectors. Thus, by varying or modifying the initial slopes of the individual sectors, the radial thrust of said sectors, as well as the nut self-locking extent can be adjusted. By mere way of indication, it should be specified that good results have been obtained by giving the resilient sectors a convergency of between about 1° and about 1.5° relative to the nut axis.

Threading of hole 2 may be provided throughout the nut thickness, but at times it is preferable to form that end opposite to the end from which said slits 6 are formed with a circular or polygonal counter-hole 8, wherein the number of sides corresponds to that of sectors 5 (FIG. 1). This counter-hole 8 extends to intersect slits 6, in this case threading 3 being limited only to the length of resilient sectors 5. Such a counter-hole is advantageous because of allowing one to adjust the required stress for elastically deflecting the individual sectors by varying its radial dimension, while avoiding during inward bending of resilient sectors 5 any damage to the threading at the bending location of said sectors.

Figure 4:
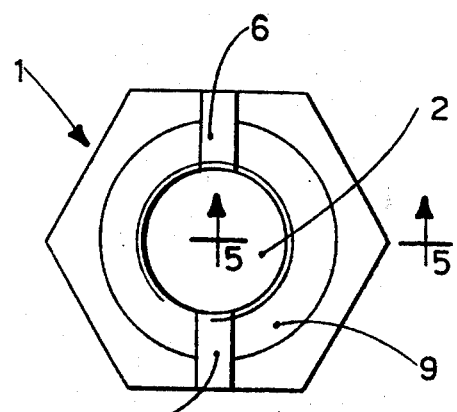
FIGS. 4 and 5 are plan and fragmentary sectional views respectively, showing a second embodiment of a self-locking nut according to the invention.
Figure 5:
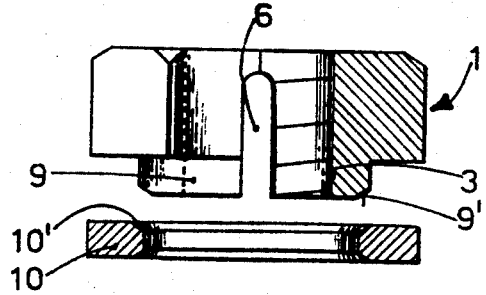

Referring now to FIGS. 4–8, a second embodiment of a self-locking nut according to the invention will be described. In the case of FIGS. 4 and 5, nut 1 still comprises a threaded hole 2 with a pair of opposing slits 6 dividing the nut body into two semicircular sectors.

Unlike the former case, in the case of FIGS. 4 and 5 said nut body 1 is formed with a cylindrical extension or neck 9 at that end from which said slits 6 are formed, the neck having along its end peripheral edge a sloping surface 9' for the purposes hereinafter described.

According to this embodiment, the resilient means or devices for nut locking further comprise a contraction ring 10 designed to interfere with said nut neck 9 to radially restrict and lock the latter, as explained in the following. On its inner edge, said ring 10 has a sloping surface 10' for initially cooperating with said sloping surface 9' of the nut neck at the time of screwing down.

Ring 10 has to interfere with neck 9 in order to restrict the latter to radially and resiliently force the inner threading of the two nut sectors against the threading of a screw or other threaded member during nut screwing down. Accordingly, contraction ring 10 should be made so that its inner edge has two or more zones lying on a smaller diameter than the outer diameter of the neck.

Figure 6:
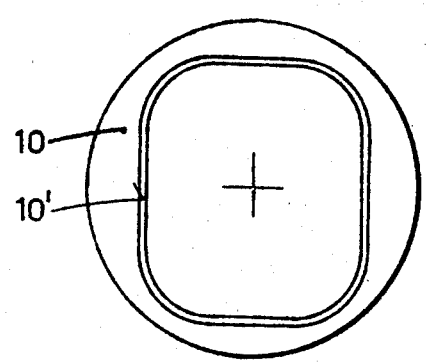
FIG. 6 is a plan view of a particular embodiment for the contraction ring shown in FIG. 5.

A solution for contraction ring 10 is shown in FIG. 6 where it will be seen that this ring 10 has an opening of quadrangular shape with rounded corners, in which the spacing between the two opposing sides is smaller than the diameter of neck 9, as schematically shown in FIG. 5. The quadrangular shape of the opening in contraction ring 10 causes a reduction in the radial width of the ring at the radiused angles of the opening; this confers on the ring a degree of radial elasticity allowing an elastic yielding of the ring for compensating any tolerances in the thread diameters, after the nut sectors have been locked against the screw.

Figure 7:
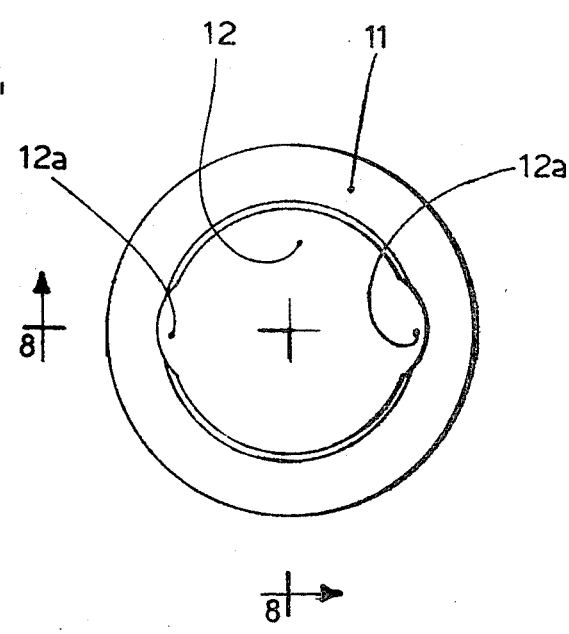

The contraction ring shown in FIG. 6 allows for a contact with neck 9 of the nut only at the central zones of the straight lengths of the inner opening edge, this involving a stress concentration which at times would be desirable to reduce. In this case, the contraction ring may be shaped as shown in FIGS. 7 and 8 of the accompanying drawings, while maintaining the inner development of the opening profile larger than the peripheral development of nut neck 9.

In said figures, a ring 11 is shown as provided with a circular opening 12 of a diameter less than that of neck 9. In order to impart spring properties to ring 11, the inner profile of opening 12 is locally interrupted or broken away, for example by opposing recesses 12a, reducing the radial width of the ring, imparting the desired elasticity to the latter, and an inner development larger than the peripheral development of the neck.

Figure 8:
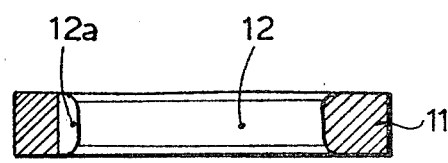
FIGS. 7 and 8 are plan and sectional views, respectively, showing a second embodiment of the contraction ring for a self-locking nut according to FIGS. 4 and 5.
Figure 9:
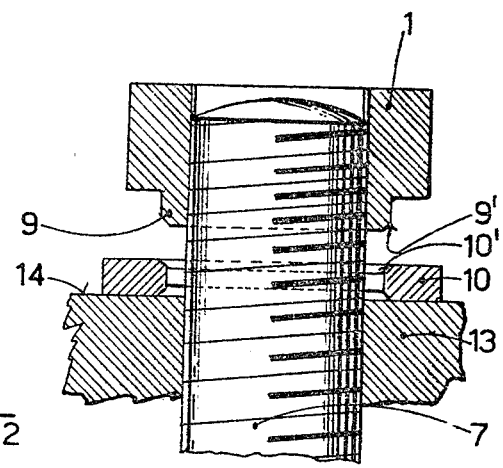
FIGS. 9 and 10 show the use of the nut shown in FIGS. 4 and 5.

In the case of FIGS. 8 and 9, recesses 12a are of semicircular shape, it being however apparent that such recesses could be of any shape, provided that they are suitable to the purpose.

By mere way of indication, it should be specified that the interference between the contraction ring and nut neck can be limited to the range of 0.2–0.5% of the threading major diameter. Particularly, it is preferable to select lower values for threadings of larger diameter, for example an interference in the range of 0.2–0.4% for threadings of a diameter larger than 16 mm, and on the other hand a higher interference for threadings of smaller diameter, for example an interference in the range of 0.3–0.5% for threadings of a diameter less than 16 mm.

Figure 10:
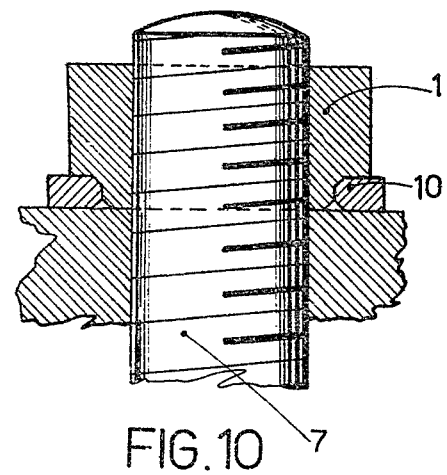

The use of the nut of FIGS. 4 and 5 is shown in the next FIGS. 9 and 10. Particularly, in FIG. 9 there is shown a screw 7, the end of which passes through a hole in a piece 13 defining a bearing or abutting surface 14, on which contraction ring 10 will rest, while nut 1 is partially screwed down on screw 7 and not yet contacting said contracting ring 10.

As soon as nut neck 9 comes in contact with contracting ring 10, due to the initial action of sloping surfaces 9' and 10' neck 9 and that portion of nut 1 on which said longitudinal slits 6 are formed, are forced to become radially restricted or narrowed against the threading of screw 7. Forced screwing of nut 1 will cause neck 9 to fully penetrate into ring 10, whereby nut 1 is completely locked on screw 7. Since the various sectors into which nut 1 is divided by slits 6 are caused to radially and elastically deflect against the threading of screw 7, it is apparent that said nut 1 can be readily unscrewed and then reused, after removal of the nut from the associated ring.

FIG. 10 of the accompanying drawings shows a further feature of this embodiment of the nut according to the invention. Particularly, it will be seen in this figure that the thickness of ring 10 is slightly greater than the length of neck 9, so that no additional overall size is added to that of the nut, as otherwise occurs with the use of conventional washers interposed between the nut and a corresponding bearing surface.

Figure 11:
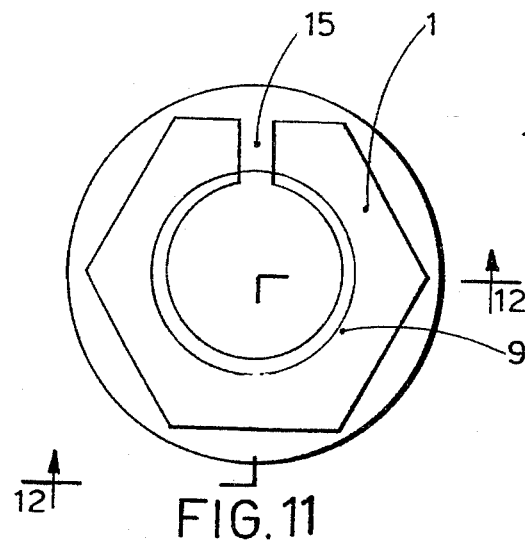
FIGS. 11 and 12 are views showing a third embodiment of a self-locking nut according to the invention.
Figure 12:
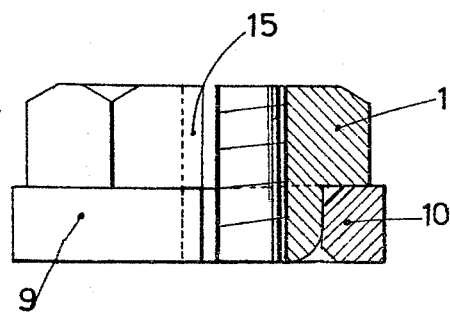

FIGS. 11 and 12 show a further variant of the preceding example. In this case, nut 1 is still provided with a neck 9 cooperating with a contraction ring 10, as previously described. The difference with respect to the preceding case is that a single slit 15 is provided and formed on one side of the nut from one end to the other of the nut. Such a slit 15 still imparts a sufficient radial elasticity to the nut for a restriction or narrowing thereof.

It should be understood that the foregoing description and subject matter shown in the accompanying drawings have been given by mere way of illustrating the principle according to the invention, which essentially consists of forming one or more longitudinal slits in the nut body to impart elasticity in a radial direction to the latter and taking advantage of such an elasticity to radially restrict or narrow the nut for providing a self-locking effect against the threading of a screw or equivalent part on which the nut is screwed down.

What is claimed is:

1. A self-locking nut adapted to receive a male threaded member comprising a body having a polygonal outer surface, a circular neck portion extending downwardly from said body, said circular neck portion having a diameter less than the distance between opposite faces of the polygonal body outer surface whereby an annular offset is formed where the circular neck portion meets the body, an axial hole extending vertically through the body and the circular neck portion, the wall of said axial hole being threaded throughout its axial length, at least one vertical longitudinal slot being formed in the body and neck portion, said slot extending completely through the vertical side of the body and neck portion to connect with the axial hole, and a resilient contraction ring engaging the neck portion to cause the size of the threaded hole to decrease to thereby provide increased friction between the threads on the mating parts to provide a desired locking action, the peripheral development for the inner edge of the opening in the contraction ring being larger than the outer peripheral development of the circular neck, the interference between the circular neck and the inner edge of the contraction ring being in the range of 0.2–0.5% of the major diameter of the threading, the thickness of said contraction ring being slightly greater than the neck length, said contraction ring having a non-circular internal surface that contacts said circular neck at spaced regions on said circular neck, thereby to promote resilient deformation of said contraction ring.

* * * * *